United States Patent [19]

Reynolds

[11] Patent Number: 5,435,200
[45] Date of Patent: Jul. 25, 1995

[54] TRANSMISSION INPUT SHAFT AND MAIN DRIVE GEAR COMBINATION

[75] Inventor: Joseph D. Reynolds, Climax, Mich.

[73] Assignee: Eaton Corporation, Cleveland, Ohio

[21] Appl. No.: 225,015

[22] Filed: Apr. 8, 1994

[51] Int. Cl.[6] ............................................. F16H 1/00
[52] U.S. Cl. ................................................... 74/325
[58] Field of Search ............................... 74/325, 331

[56] References Cited

U.S. PATENT DOCUMENTS

| | | | |
|---|---|---|---|
| 2,696,124 | 12/1954 | Flowers et al. | 74/325 |
| 3,237,472 | 3/1966 | Perkins et al. | 74/331 |
| 4,034,620 | 7/1977 | McNamara et al. | 74/331 |
| 4,075,870 | 2/1978 | Seifried | 74/325 |

Primary Examiner—Dirk Wright
Attorney, Agent, or Firm—Albert E. Chrow; Howard D. Gordon

[57] ABSTRACT

An input shaft (2) and a main drive gear drive gear (22) combination for a vehicle countershaft type transmission is provided. In a preferred embodiment referenced by numeral (100), an inner peripheral surface of a drive gear (22) having splines (36) and a splined outer peripheral surface (9) of input shaft (2) having splines (34) are adapted to limit axial and radial movement between the two as well as splines (34) and (36) being provided with an amount of rotational movement of one relative the other effective to reduce noise when the vehicle's engine is idling and the transmission is in neutral.

2 Claims, 1 Drawing Sheet

TRANSMISSION INPUT SHAFT AND MAIN DRIVE GEAR COMBINATION

INTRODUCTION

This invention relates generally to a vehicular transmission main drive gear and input shaft combination that are in splined engagement with each other and more particularly to where the combination is adapted to limit axial and radial movement of the main drive gear relative to the input shaft and also reduce noise, when the vehicle's engine is idling and the transmission is in neutral, by providing an effective amount of rotary movement of the main drive gear splines or the input shaft splines relative to the other.

BACKGROUND OF THE INVENTION

The present invention is directed towards vehicular transmissions having a pair of countershafts in addition to a mainshaft such as the twin countershaft transmission described in U.S. Pat. No. 4,640,145, the disclosure of which is included herein by reference.

Such countershaft type transmissions are commonly found in track particularly heavy duty track, applications to provide both high torque and multiple gear ratio options.

Heretofore, the transmission's main drive gear which is driven by an input shaft from the vehicle's engine has characteristically exhibited rattle noise particularly when the vehicle's engine is idling and the transmission is in neutral.

The present invention in addition to limiting axial and radial movement between a transmission input shaft and main drive gear also effectively reduces noise by providing a high degree of rotary movement between splines that engage the two together.

OBJECT OF THE INVENTION

It is an object of this invention to provide a rotary vehicular transmission input shaft and main drive gear combination.

It is another object of this invention to provide a rotary vehicular transmission input shaft and main drive gear combination that effectively reduces noise during operation and more particularly when the engine is idling and the transmission is in neutral.

DESCRIPTION OF SOME PREFERRED EMBODIMENTS

Figure 1:
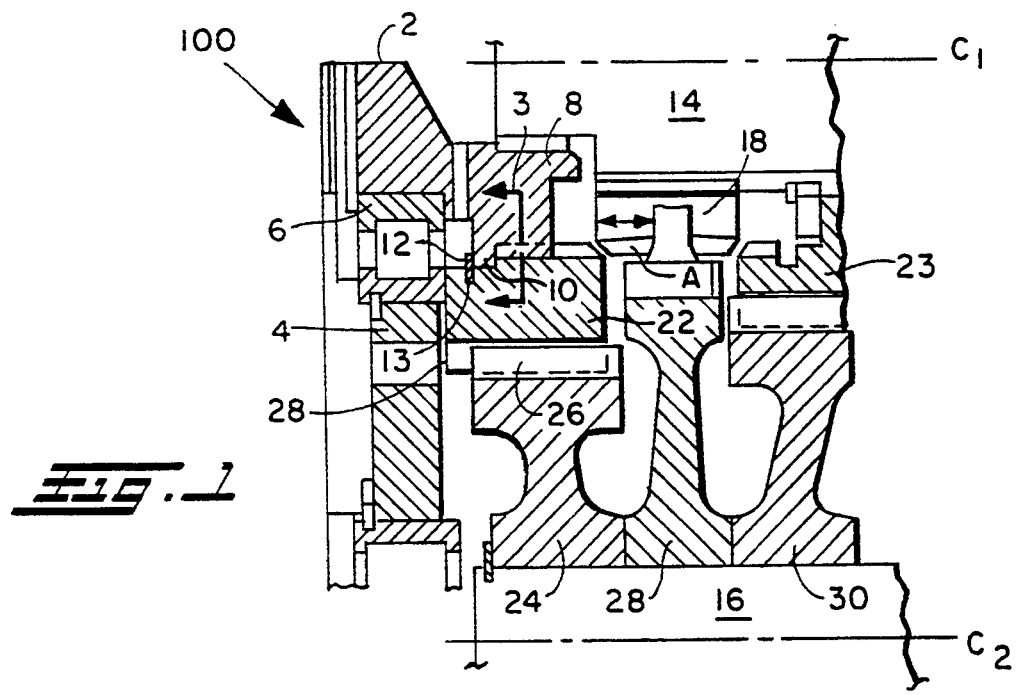
FIG. 1 is a partial central cross-sectional view of an embodiment of the combination of the invention referenced by numeral 100.

In FIG. 1 the combination of the invention referenced by numeral 100 comprises a rotary input shaft 2 that is journaled for rotation on a vehicular transmission housing 4 by bearings 6 and drives the transmission's main drive gear 22 hereinafter described in greater detail.

The transmission is a twin countershaft type transmission having a rotary mainshaft 14 having a central rotational axis $C_1$ that is in substantial parallel spaced-apart relationship to a rotary countershaft referenced by numeral 16 and having a central rotational axis $C_2$. The rotational axis of input shaft 2 and mainshaft 14 are in substantial alignment and the other of the paired countershafts (not shown) is characteristically disposed in the opposite side of the mainshaft in parallel spaced-apart relationship therewith.

Mainshaft 14 carries a plurality of floating mainshaft gears, such as the one referenced by numeral 23, that are selectively clutched to the mainshaft for rotation therewith by a clutch mechanism or assembly such as referenced by numeral 18 that can be selectively moved axially back and forth along mainshaft 14 as shown by the arrows.

Countershaft 16 carries a plurality of gears such as referenced by numerals 24, 28, and 30 that are most commonly, all secured for rotation with countershaft 16. Thus, for example, when gear 23 is clutched by clutch assembly 18 to mainshaft 14, it is operative to rotate mainshaft 14 in response to rotation of gear 30 which in turn is securred to and rotated by countershaft 16 with mainshaft 14 being rotated at a rotational speed determined by the gear ratio established between the two gears.

Figure 2:
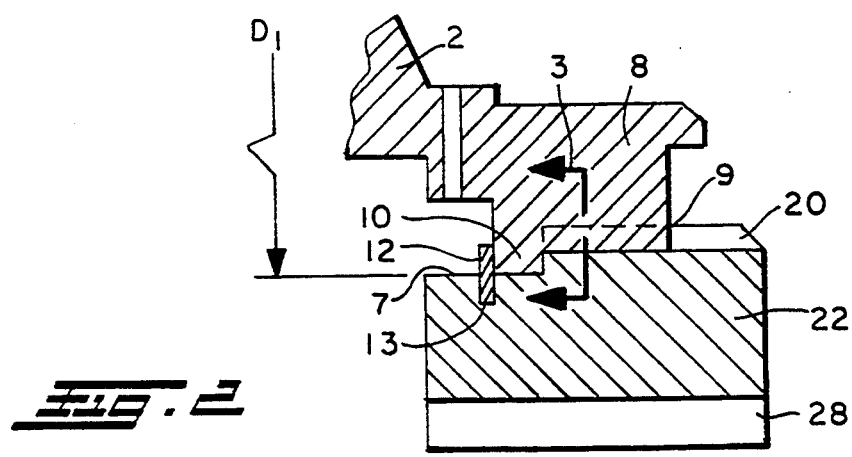
FIG. 2 is an expanded view of the splined engagement region of the combination of FIG. 1.

Input shaft 2 has a hub 8 having a splined outer peripheral surface referenced by numeral 9 in FIG. 2 that encircles mainshaft 14. The splined outer peripheral surface 9 of hub 8 has circumferentially spaced-apart splines of which one is referenced by numeral 34 in FIG. 3.

Outer peripheral surface 9 of hub 8 also includes an annular shoulder 10 that extends radially outwardly towards drive gear 22. Although shoulder 10 may be a continuously solid shoulder about outer peripheral surface 9 of hub 8, for machining purposes it preferably is in the form of the circumferentially spaced-apart tips of splines 34 shown in FIG. 3 that are referenced by numeral 10 and have not been dressed down as have those referenced by numeral 17 for splined engagement with the bottom of the trough 19 between adjacent splines 36 of drive gear 22 to limit radial movement of drive gear 22 as hereinafter more fully described.

The inner peripheral surface of drive gear 22 has a larger diameter shoulder 7 whose diameter is referenced by $D_1$ in FIG. 2. Shoulder 7 is adjacent the side of gear 22 facing away from clutch assembly 18. The inner peripheral surface of drive gear 22 also has circumferentially spaced-apart teeth 20 adjacent the side of gear 22 facing towards clutch assembly 18. Clutch assembly 18 has circumferentially spaced-apart teeth 19 that engage teeth 20 of gear 22 when clutch assembly 18 is moved towards the viewer's left in FIG. 1. Movement of clutch assembly 18 toward the viewer's fight in FIG. 1 will secure gear 23 to mainshaft 14 and enable gear 30 to rotate mainshaft 14 as previously described.

The previously described circumferentially spaced-apart splines 36 disposed about the inner peripheral surface of drive gear 22 are disposed between the shoulder 7 on one side and teeth 20 on the opposite side as shown in FIGS. 1 and 2.

An annular slot 13 is disposed in shoulder 7 in axial spaced-apart relationship to splines 36. Slot 13 contains a removable retaining ring such as a snap-ting referenced by numeral 12 that extends radially inwardly towards the outer peripheral surface 9 of hub 8 to define an annular groove between snap-ting 12 and the splined inner peripheral surface of drive gear 22 that is operative to receive shoulder 10 of hub 8 thereinto and prevent relative axial movement between input shaft 2 and drive gear 22.

The outer peripheral surface of drive gear 22 is provided with means for operatively connecting drive gear 22 to counter shaft 16. In the preferred embodiment of the invention, the operative connection is provided through a countershaft drive gear such as gear 24 shown in FIG. 1 that is disposed between countershaft 16 and drive gear 22 and is secured for rotation with countershaft 16.

More particularly, the outer peripheral surface of drive gear 22 is provided with circumferentially spaced-apart teeth 28 shown in FIGS. 1 and 2 that meshingly engage circumferentially spaced-apart teeth 26 in the outer periphery of countershaft drive gear 24 as shown in FIG. 1. Movement of clutch assembly 18 toward the viewer's left in FIG. 1 enables teeth 19 to engage teeth 20 of drive gear 22 which in turn enables input shaft 2 to rotate mainshaft 14 as well or counter shaft 16 through counter shaft drive gear 24 which also causes gears 28 and 30 to rotate of which gear 28 can be utilized as an input to a power-take-off unit when desired.

Figure 3:
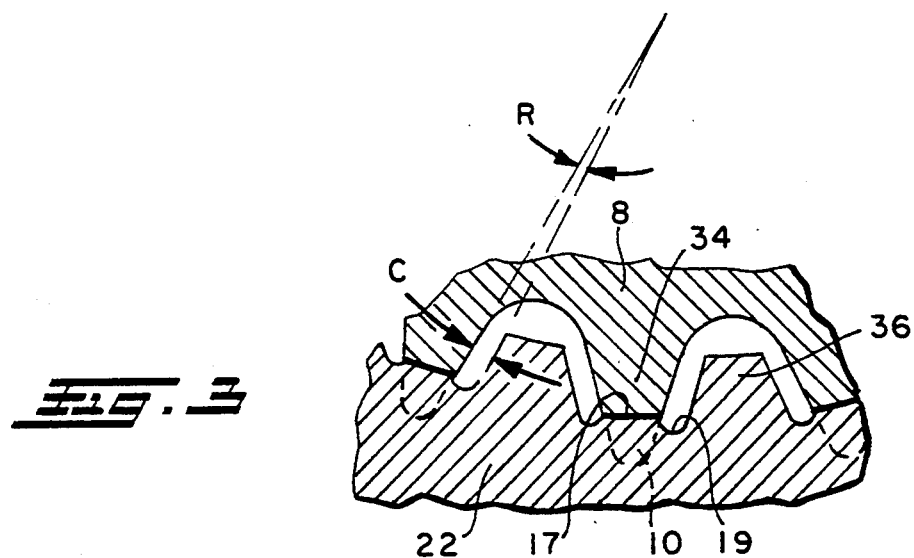
FIGS 3 is a view in the direction of the arrows taken along view line 3 in FIGS. 1 and 2.

As hereinbefore described with respect to FIG. 3, the tips of splines 34 have been removed except for in the region required to provide shoulder 10. Such is done preferably in a manner that provides a flattened end 17 to the ends of splines 34 that are dimensioned to preferably provide about a 0.002 inch clearance between ends 17 and the bottom of the trough or grooves between splines 36 of drive gear 22 referenced by numeral 19 in FIG. 3. Such close tolerance minimizes radial movement between the drive gear and the input shaft. Additionally, noise is effectively reduced by providing a high degree of rotation between splines 34 of input shaft 2 and splines 36 of drive gear 22. It has been determined that about 3 degrees of rotational movement referenced by "R" in FIG. 3 of either of splines 34 or 36 relative the other to provide a circumferential clearance between the facing sidewalls of splines 34 and 36 referenced by "C" in FIG. 3 that is effective to reduce noise by diminishing that tendency for contact between the facing sidewalls of splines 34 and 36 when the transmission is in neutral and the vehicle's engine is idling.

As earlier described, gear 30 is secured for rotation with countershaft 16 and movement of clutch assembly 18 towards the viewer's fight in FIG. 1 secures gear 23 to mainshaft 14 and enables gear 30 to rotate mainshaft 14 upon rotation of countershaft 16. It is also to be noted that countershaft gear 28 is not engageable by clutch assembly 18 but rotates with countershaft 16 upon rotation of either drive gear 22 or mainshaft 14. As previously described, gear 28 is operative to drive a rotary power-take-off unit through an opening provided in the side of the transmission housing when such is desired.

What is claimed is:

1. In combination; a rotary input shaft driven by a vehicular engine journaled for rotation on a change gear transmission housing and having an outer peripheral surface having circumferentially spaced-apart splines that encircle a rotary mainshaft that is in spaced-apart parallel relationship to a rotary countershaft of the transmission, a drive gear having an inner peripheral surface encircling the input shaft splines and having circumferentially spaced-apart splines that are in splined engagement therewith, said drive gear having means on an outer peripheral surface operatively connecting the drive gear to the countershaft, said drive gear having circumferentially spaced-apart teeth disposed about the inner peripheral surface that are clutchingly engageable with teeth of a rotary clutch assembly selectively positionable along the mainshaft and operative to rotate the drive gear about the mainshaft upon clutched engagement therebetween, said drive gear having a shoulder having an annular slot therein that is in spaced-apart relationship to the drive gear splines and contains a removable retaining ring that extends radially inwardly therefrom to define an annular groove in the shoulder between the retaining ring and the drive gear splines, said input shaft having an annular shoulder extending radially inwardly from the outer peripheral surface into the groove defined between the retaining ring and the drive gear splines and operative to limit axial movement of the drive gear relative the input shaft, said input shaft and drive gear splines dimensionally adapted to limit radial movement of the drive gear relative the input shaft, and said input shaft and drive gear splines provided with an amount of rotational movement of one relative the other effective to reduce noise when the transmission is in neutral and the engine is idling.

2. The combination of claim 1 wherein the means operatively connecting the drive gear to the countershaft is provided by the drive gear outer peripheral surface having circumferentially spaced-apart teeth that are meshingly engaged with circumferentially spaced-apart teeth in the outer peripheral surface of a countershaft gear secured to the countershaft.

* * * * *